US011717003B2

(12) United States Patent
Han et al.

(10) Patent No.: US 11,717,003 B2
(45) Date of Patent: Aug. 8, 2023

(54) GRILLING METHOD FOR CONTROLLING CONTENT OF POLYCYCLIC AROMATIC HYDROCARBONS IN CHARCOAL-GRILLED MEAT

(71) Applicants: Nanjing Agricultural University, Jiangsu (CN); Wens Foodstuff Group Co., Ltd., Guangdong (CN)

(72) Inventors: Minyi Han, Jiangsu (CN); Yangjian Hu, Jiangsu (CN); Xianming Zeng, Jiangsu (CN); Huhu Wang, Jiangsu (CN); Weijun He, Guangdong (CN); Junjie Ye, Guangdong (CN); Shaolin Deng, Jiangsu (CN); Xinglian Xu, Jiangsu (CN); Guanghong Zhou, Jiangsu (CN)

(73) Assignees: Nanjing Agricultural University, Nanjing (CN); Wens Foodstuff Group Co., Ltd., Yunfu (CN)

( * ) Notice: Subject to any disclaimer, the term of this patent is extended or adjusted under 35 U.S.C. 154(b) by 123 days.

(21) Appl. No.: 17/121,716

(22) Filed: Dec. 14, 2020

(65) Prior Publication Data
US 2022/0110335 A1 Apr. 14, 2022

(30) Foreign Application Priority Data
Oct. 10, 2020 (CN) .......................... 202011081270.1

(51) Int. Cl.
A23B 4/015 (2006.01)
A23L 13/50 (2016.01)
A23L 5/10 (2016.01)
A23L 5/30 (2016.01)
A23L 13/40 (2023.01)
A23L 3/26 (2006.01)
A23L 3/32 (2006.01)

(52) U.S. Cl.
CPC ................ *A23B 4/015* (2013.01); *A23L 3/26* (2013.01); *A23L 3/32* (2013.01); *A23L 5/10* (2016.08); *A23L 5/11* (2016.08); *A23L 5/30* (2016.08); *A23L 13/43* (2016.08); *A23L 13/55* (2016.08); *A23V 2002/00* (2013.01)

(58) Field of Classification Search
CPC ......... A23B 4/015; A23L 13/03; A23L 13/43; A23L 13/50; A23L 13/55; A23L 13/57; A23L 5/11; A23L 5/12; A23L 5/26; A23L 5/30; A23L 5/32
USPC ...................................................... 426/234
See application file for complete search history.

(56) References Cited

U.S. PATENT DOCUMENTS

| 4,436,525 A * | 3/1984 | Zmoda .................... C10L 11/04 44/266 |
| 5,524,501 A | 6/1996 | Patterson et al. |
| 6,171,639 B1 * | 1/2001 | Vella ....................... A23L 27/60 426/589 |
| 7,112,688 B1 | 9/2006 | Tysinger et al. |
| 9,326,501 B2 | 5/2016 | Fuller |
| 9,370,496 B2 | 6/2016 | Miller |
| 10,640,728 B2 | 5/2020 | Liu et al. |
| 2001/0043974 A1 * | 11/2001 | Linford ..................... A23L 5/12 426/523 |
| 2005/0181104 A1 * | 8/2005 | Shibata ................... A23B 4/064 426/524 |
| 2007/0196555 A1 * | 8/2007 | Young ................... A23L 13/428 426/589 |
| 2008/0102186 A1 * | 5/2008 | Perlman ................... A23D 9/00 426/573 |
| 2008/0202489 A1 * | 8/2008 | Sorenson ............. A47J 37/0786 126/25 R |
| 2012/0156340 A1 * | 6/2012 | Rasanayagam ....... A23L 3/3445 426/234 |
| 2016/0192690 A1 * | 7/2016 | Domazakis ............. A23L 13/43 426/641 |
| 2017/0000167 A1 * | 1/2017 | Corrigan ................. A23K 50/42 |
| 2017/0348654 A1 * | 12/2017 | Ghazarian ............. B01F 35/213 |
| 2019/0098913 A1 | 4/2019 | Saberi |
| 2019/0174788 A1 | 6/2019 | Fletcher |
| 2019/0256811 A1 * | 8/2019 | Hull ........................... C12J 1/00 |

FOREIGN PATENT DOCUMENTS

| CN | 101081048 B | 12/2010 |
| CN | 104232464 A | 12/2014 |
| CN | 106147996 A | 11/2016 |
| CN | 107299001 A | 10/2017 |
| CN | 107372862 A | 11/2017 |
| CN | 104877886 B | 6/2018 |

(Continued)

OTHER PUBLICATIONS

Gimme Some Oven; "The Juiciest Grilled Chicken Kabobs"; May 24, 2019 https://web.archive.org/web/20190729012332/https://www.gimmesomeoven.com/grilled-chicken-kabobs/ (Year: 2019).*

(Continued)

*Primary Examiner* — Drew E Becker
*Assistant Examiner* — Austin Parker Taylor

(57) ABSTRACT

The disclosure relates to the technical field of food processing, particularly to a grilling method for controlling the content of polycyclic aromatic hydrocarbons in charcoal grilled meat. The grilling method comprises: Step 1, dispensing to-be-grilled meat into boxes with sealing covers, and adding edible oil into the boxes, wherein a ratio of edible oil to the weight of meat is 25~50 mL/1000 g, and sealing the covers; Step 2, carrying out plasma treatment on the meat sealed in Step 1; and Step 3: placing the meat treated using plasma onto a grill and grilling. The grilling method for controlling the content of polycyclic aromatic hydrocarbons in charcoal grilled meat is simple, convenient, and easy to operate; it is not needed adding unessential food additives, thereby significantly reducing the content of polycyclic aromatic hydrocarbons in meat products, saving cost and improving safety while remaining the flavor of food itself.

4 Claims, No Drawings

(56) References Cited

FOREIGN PATENT DOCUMENTS

| CN | 108753438 A | 11/2018 |
|---|---|---|
| CN | 109423426 A | 3/2019 |
| CN | 109777602 A | 5/2019 |
| CN | 110129132 A | 8/2019 |
| CN | 209345983 U | 9/2019 |

OTHER PUBLICATIONS

Ahn, Karen; Use Baking Soda to Neutralize Bitter & Sour Flavors in Food; Wonder How To; Aug. 6, 2014 https://food-hacks.wonderhowto.com/how-to/ingredients-101-use-baking-soda-neutralize-bitter-sour-flavors-food-0156750/#:~:text=So%2C%20if%20you've%20added,rough%20edges%20off%20the%20taste. (Year: 2014).*

Riches, Derrick; "The Ultimate Guide to Grilling"; The Spruce Eats; May 22, 2020 https://www.thespruceeats.com/how-to-grill-331526 (Year: 2020).*

Mylan, Tom; "Grilled Mutton Chop"; Food52; Jun. 10, 2014; https://food52.com/recipes/28883-grilled-mutton-chop (Year: 2014).*

National Food Safety Standard: Determination of Polycyclic Aromatic Hydrocarbons in Food, National Standards of the People's Republic of China, Dec. 23, 2016, pp. 1-10, GB 5009.265-2016, National Health and Family Planning Commission of the People's Republic of China, China Food and Drug Administration.

\* cited by examiner

GRILLING METHOD FOR CONTROLLING CONTENT OF POLYCYCLIC AROMATIC HYDROCARBONS IN CHARCOAL-GRILLED MEAT

CROSS REFERENCE TO RELATED APPLICATIONS

The present application claims the benefit of Chinese Patent Application No. 202011081270.1 filed on Oct. 10, 2020, the contents of which are hereby incorporated by reference.

TECHNICAL FIELD

The disclosure pertains to the technical field of food processing, and particularly to a grilling method for controlling the content of polycyclic aromatic hydrocarbons in charcoal-grilled meat.

BACKGROUND

Polycyclic aromatic hydrocarbons (PAHs), which are harmful substances, will inevitably be produced in the process of smoked, grilled and fried meat products. Such substances are regarded as with strong carcinogenicity and mutagenicity internationally, which can cause various diseases such as breast cancer and lung cancer if consuming for a long term, and generates a certain threat to a consumer. At present, the control means of the grilled food processing technology on such the harmful substances mainly include pre-marinating, adding antioxidant active substances (for example polyphenols), however, these steps will undoubtedly change the original flavor of grilled food, and the control effect of harmful substances is not stable, and good reproducibility cannot be realized under different cooking conditions. Therefore, it is of great significance to provide a grilling method for controlling the content of polycyclic aromatic hydrocarbons (PAHs) in smoked and grilled meat products.

SUMMARY

In view of mentioned above, a grilling method is required to control the content of polycyclic aromatic hydrocarbons (PAHs) in charcoal-grilled meats.

In order to achieve the above objective, the disclosure adopts the following technical solution:

A grilling method for controlling the content of polycyclic aromatic hydrocarbons in charcoal grilled meat, comprising the following steps:

Step 1, dispensing to-be-grilled meat into boxes with sealing covers, and adding edible oil into the boxes, wherein a ratio of edible oil to the weight of meat is 25~50 mL/1000 g, and sealing the covers;

Step 2, carrying out plasma treatment on the meat sealed in Step 1; and

Step 3: placing the plasma treated meat onto a grill and grilling.

Further, in the above grilling method for controlling the content of polycyclic aromatic hydrocarbons in charcoal grilled meat, the ratio of edible oil to the weight of meat is 25 mL/1000 g. Further, in the above grilling method for controlling the content of polycyclic aromatic hydrocarbons in charcoal grilled meat, the ratio of edible oil to the weight of meat is 30 mL/1000 g. Further, in the above grilling method for controlling the content of polycyclic aromatic hydrocarbons in charcoal grilled meat, the ratio of edible oil to the weight of meat is 35 mL/1000 g. Further, in the above grilling method for controlling the content of polycyclic aromatic hydrocarbons in charcoal grilled meat, the ratio of edible oil to the weight of meat is 40 mL/1000 g. Further, in the above grilling method for controlling the content of polycyclic aromatic hydrocarbons in charcoal grilled meat, the ratio of edible oil to the weight of meat is 45 mL/1000 g. Further, in the above grilling method for controlling the content of polycyclic aromatic hydrocarbons in charcoal grilled meat, the ratio of edible oil to the weight of meat is 50 mL/1000 g.

Further, in the above grilling method for controlling the content of polycyclic aromatic hydrocarbons in charcoal grilled meat, the addition manner of edible oil includes but is not limited to conventional smearing, injection and curing by rolling.

Further, in the above grilling method for controlling the content of polycyclic aromatic hydrocarbons in charcoal grilled meat, the edible oil is sunflower seed oil.

Further, in the above grilling method for controlling the content of polycyclic aromatic hydrocarbons in charcoal grilled meat, before dispensing, the meat is cut into strips with a thickness of 1~2.5 cm and then soaked into soaking solution which is prepared by water, an acidic flavoring agent and edible baking soda.

Further, in the above grilling method for controlling the content of polycyclic aromatic hydrocarbons in charcoal grilled meat, the thickness of the cut meat strip is 1 cm. Further, in the above grilling method for controlling the content of polycyclic aromatic hydrocarbons in charcoal grilled meat, the thickness of the cut meat strip is 1.5 cm. Further, in the above grilling method for controlling the content of polycyclic aromatic hydrocarbons in charcoal grilled meat, the thickness of the cut meat strip is 2 cm. Further, in the above grilling method for controlling the content of polycyclic aromatic hydrocarbons in charcoal grilled meat, the thickness of the cut meat strip is 2.5 cm.

Further, in the above grilling method for controlling the content of polycyclic aromatic hydrocarbons in charcoal grilled meat, the meat is cut parallel to the direction of muscle fibers.

Further, in the above grilling method for controlling the content of polycyclic aromatic hydrocarbons in charcoal grilled meat, the acidic flavoring agent is vinegar, the volume content of vinegar is 0.8%~1% that of the soaking solution; the mass percentage of baking soda is 0.1~0.5% that of the soaking solution; the pH of the soaking solution is 3.3~3.8.

Further, in the above grilling method for controlling the content of polycyclic aromatic hydrocarbons in charcoal grilled meat, the acidic flavoring agent is vinegar, the volume content of vinegar is 0.8% that of the soaking solution; the mass percentage of baking soda is 0.1~0.5% that of the soaking solution; the pH of the soaking solution is 3.3~3.8. Further, in the above grilling method for controlling the content of polycyclic aromatic hydrocarbons in charcoal grilled meat, the acidic flavoring agent is vinegar, the volume content of vinegar is 0.9% that of the soaking solution; the mass percentage of baking soda is 0.1~0.5% that of the soaking solution; the pH of the soaking solution is 3.3~3.8. Further, in the above grilling method for controlling the content of polycyclic aromatic hydrocarbons in charcoal grilled meat, the acidic flavoring agent is vinegar, the volume content of vinegar is 1% that of the soaking solution; the mass percentage of baking soda is 0.1~0.5% that of the soaking solution; the pH of the soaking solution is 3.3~3.8. Further, in the above grilling method for controlling the content of polycyclic aromatic hydrocarbons in charcoal grilled meat, the acidic flavoring agent is vinegar, the volume content of vinegar is 0.8%~1% that of the soaking solution; the mass percentage of baking soda is 0.1% of the soaking solution; the pH of the soaking solution is 3.3~3.8. Further, in the above grilling method for controlling the content of polycyclic aromatic hydrocarbons in charcoal grilled meat, the acidic flavoring agent is vinegar, the volume content of vinegar is 0.8%~1% that of the soaking solution; the mass percentage of baking soda is 0.2% of the soaking solution; the pH of the soaking solution is 3.3~3.8. Further, in the above grilling method for controlling the content of polycyclic aromatic hydrocarbons in charcoal grilled meat, the acidic flavoring agent is vinegar, the volume content of vinegar is 0.8%~1% that of the soaking solution; the mass percentage of baking soda is 0.3% of the soaking solution; the pH of the soaking solution is 3.3~3.8. Further, in the above grilling method for controlling the content of polycyclic aromatic hydrocarbons in charcoal grilled meat, the acidic flavoring agent is vinegar, the volume content of vinegar is 0.8%~1% that of the soaking solution; the mass percentage of baking soda is 0.4% of the soaking solution; the pH of the soaking solution is 3.3~3.8. Further, in the above grilling method for controlling the content of polycyclic aromatic hydrocarbons in charcoal grilled meat, the acidic flavoring agent is vinegar, the volume content of vinegar is 0.8%~1% that of the soaking solution; the mass percentage of baking soda is 0.5% of the soaking solution; the pH of the soaking solution is 3.3~3.8. Further, in the above grilling method for controlling the content of polycyclic aromatic hydrocarbons in charcoal grilled meat, the acidic flavoring agent is vinegar, the volume content of vinegar is 0.8%~1% that of the soaking solution; the mass percentage of baking soda is 0.1~0.5% that of the soaking solution; the pH of the soaking solution is 3.3. Further, in the above grilling method for controlling the content of polycyclic aromatic hydrocarbons in charcoal grilled meat, the acidic flavoring agent is vinegar, the volume content of vinegar is 0.8%~1% that of the soaking solution; the mass percentage of baking soda is 0.1~0.5% that of the soaking solution; the pH of the soaking solution is 3.4. Further, in the above grilling method for controlling the content of polycyclic aromatic hydrocarbons in charcoal grilled meat, the acidic flavoring agent is vinegar, the volume content of vinegar is 0.8%~1% that of the soaking solution; the mass percentage of baking soda is 0.1~0.5% that of the soaking solution; the pH of the soaking solution is 3.5. Further, in the above grilling method for controlling the content of polycyclic aromatic hydrocarbons in charcoal grilled meat, the acidic flavoring agent is vinegar, the volume content of vinegar is 0.8%~1% that of the soaking solution; the mass percentage of baking soda is 0.1~0.5% that of the soaking solution; the pH of the soaking solution is 3.6.

Further, in the above grilling method for controlling the content of polycyclic aromatic hydrocarbons in charcoal grilled meat, the acidic flavoring agent is vinegar, the volume content of vinegar is 0.8%~1% that of the soaking solution; the mass percentage of baking soda is 0.1~0.5% that of the soaking solution; the pH of the soaking solution is 3.7. Further, in the above grilling method for controlling the content of polycyclic aromatic hydrocarbons in charcoal grilled meat, the acidic flavoring agent is vinegar, the volume content of vinegar is 0.8%~1% that of the soaking solution; the mass percentage of baking soda is 0.1~0.5% that of the soaking solution; the pH of the soaking solution is 3.8.

Further, in the above grilling method for controlling the content of polycyclic aromatic hydrocarbons in charcoal grilled meat, a ratio of to-be-grilled meat to soaking solution is 1000 g/1000 mL, and the condition of soaking is soaking for 1~4 h at 4° C.

Further, in the above grilling method for controlling the content of polycyclic aromatic hydrocarbons in charcoal grilled meat, a ratio of to-be-grilled meat to soaking solution is 1000 g/1000 mL, and the condition of soaking is soaking for 1 h at 4° C. Further, in the above grilling method for controlling the content of polycyclic aromatic hydrocarbons in charcoal grilled meat, a ratio of to-be-grilled meat to soaking solution is 1000 g/1000 mL, and the condition of soaking is soaking for 2 h at 4° C. Further, in the above grilling method for controlling the content of polycyclic aromatic hydrocarbons in charcoal grilled meat, a ratio of to-be-grilled meat to soaking solution is 1000 g/1000 mL, and the condition of soaking is soaking for 3 h at 4° C. Further, in the above grilling method for controlling the content of polycyclic aromatic hydrocarbons in charcoal grilled meat, a ratio of to-be-grilled meat to soaking solution is 1000 g/1000 mL, and the condition of soaking is soaking for 4 h at 4° C.

Further, in the above grilling method for controlling the content of polycyclic aromatic hydrocarbons in charcoal grilled meat, in Step 2, the specific plasma treatment method is that the sealed meat is placed in a high-voltage electric field cold plasma non-thermal sterilization equipment, treatment parameters are set as an electrode gap being 4.0 cm, the voltage of the high-voltage electric field being 80 kV, and discharging time being 120~180 s.

Further, in the above grilling method for controlling the content of polycyclic aromatic hydrocarbons in charcoal grilled meat, in Step 2, the specific plasma treatment method is that the sealed meat is placed in a high-voltage electric field cold plasma non-thermal sterilization equipment, treatment parameters are set as an electrode gap being 4.0 cm, the voltage of the high-voltage electric field being 80 kV, and discharging time being 120 s. Further, in the above grilling method for controlling the content of polycyclic aromatic hydrocarbons in charcoal grilled meat, in Step 2, the specific plasma treatment method is that the sealed meat is placed in a high-voltage electric field cold plasma non-thermal sterilization equipment, treatment parameters are set as an electrode gap being 4.0 cm, the voltage of the high-voltage electric field being 80 kV, and discharging time being 130 s. Further, in the above grilling method for controlling the content of polycyclic aromatic hydrocarbons in charcoal grilled meat, in Step 2, the specific plasma treatment method is that the sealed meat is placed in a high-voltage electric field cold plasma non-thermal sterilization equipment, treatment parameters are set as an electrode gap being 4.0 cm, the voltage of the high-voltage electric field being 80 kV, and discharging time being 140 s. Further, in the above grilling method for controlling the content of polycyclic aromatic hydrocarbons in charcoal grilled meat, in Step 2, the specific plasma treatment method is that the sealed meat is placed in a high-voltage electric field cold plasma non-thermal sterilization equipment, treatment parameters are set as an electrode gap being 4.0 cm, the voltage of the high-voltage electric field being 80 kV, and discharging time being 150 s. Further, in the above grilling method for controlling the content of polycyclic aromatic hydrocarbons in charcoal grilled meat, in Step 2, the specific plasma treatment method is that the sealed meat is placed in a high-voltage electric field cold plasma non-thermal sterilization equipment, treatment parameters are set as an electrode gap being 4.0 cm, the voltage of the high-voltage electric field being 80 kV, and discharging time being 160 s. Further, in the above grilling method for controlling the content of polycyclic aromatic hydrocarbons in charcoal grilled meat, in Step 2, the specific plasma treatment method is that the sealed meat is placed in a high-voltage electric field cold plasma non-thermal sterilization equipment, treatment parameters are set as an electrode gap being 4.0 cm, the voltage of the high-voltage electric field being 80 kV, and discharging time being 170 s. Further, in the above grilling method for controlling the content of polycyclic aromatic hydrocarbons in charcoal grilled meat, in Step 2, the specific plasma treatment method is that the sealed meat is placed in a high-voltage electric field cold plasma non-thermal sterilization equipment, treatment parameters are set as an electrode gap being 4.0 cm, the voltage of the high-voltage electric field being 80 kV, and discharging time being 180 s.

Further, in the above grilling method for controlling the content of polycyclic aromatic hydrocarbons in charcoal grilled meat, the specific grilling method in Step 3 is as follows: solid alcohol block is used to ignite the charcoal fire; after the open fire of all the charcoal is ended, the sample meat is placed on the grill which is far away from a fire source by 5 cm; the meat is turned over every 2 min; when the grilling time is 12 min, the internal temperature of the sample is measured with a probe thermometer; when the internal temperature reaches 75° C., the grilling is stopped; when the internal temperature does not reach 75° C., the grilling is continued, until the internal temperature is 75° C.

Further, in the above grilling method for controlling the content of polycyclic aromatic hydrocarbons in charcoal grilled meat, when the internal temperature of the sample reaches 75° C., the surface temperature of charcoal fire at the moment is measured using an infrared thermometer, and the surface temperature of charcoal fire is maintained at 180~220° C.

Further, in the above grilling method for controlling the content of polycyclic aromatic hydrocarbons in charcoal grilled meat, the grill is a stainless-steel grill.

Further, in the above grilling method for controlling the content of polycyclic aromatic hydrocarbons in charcoal grilled meat, the types of meat include chicken, duck, beef, pork and mutton.

A charcoal grilled meat, is prepared by using the above grilling method for controlling the content of polycyclic aromatic hydrocarbons in charcoal grilled meat.

The disclosure has the beneficial effects:

(1) The grilling method provided by the disclosure, soak the to-be-grilled meat into the soaking solution, the soaking solution can significantly reduce the pH value of the meat, thereby not only increasing the flavor of the meat and reducing the content of polycyclic aromatic hydrocarbons in the meat products.

(2) The grilling oil of the disclosure is sunflower seed oil, and compared to the common soybean oil and rapeseed oil, the sunflower seed oil is rich in artificial antioxidant vitamin E, economic cost is more affordable. In the process of manufacturing, pollution level of sunflower oil with polycyclic aromatic hydrocarbons is lower, which further improves the safety of the grilled meat.

(3) The disclosure adopts the high-voltage electric field cold plasma non-thermal sterilization equipment to pack the sealed to-be-grilled meat, which has the advantages of simple operation and high working efficiency. After the plasma package treatment, the content of polycyclic aromatic hydrocarbons in the meat is significantly reduced.

(4) The grilling process provided by the disclosure is simple, convenient and easy to operate; there is no need to add unnecessary food additives in the grilling process, so that retain the flavor of the food itself is maintained, while cost is further saved, and the safety is improved.

DESCRIPTION OF THE EMBODIMENTS

For making the objective, technical solution and advantages of the disclosure more clear, next, the technical solution of the disclosure will be further clearly and completely described in combination with embodiments of the disclosure. It is noted that the described embodiments are some embodiments of the disclosure but not all the embodiments. Based on the embodiments of the disclosure, other embodiments obtained by those skilled in the art without creative efforts all belong to the protective scope of the disclosure.

In the description of the disclosure, products used in embodiments are as follows:

vinegar and sunflower seed oil, which are purchased from Tiejiangying Shop of Nanjing Suguo supermarket;

charcoal fire, environment-friendly smokeless charcoal, which is purchased from OOOE grilled meat appliance exclusive store;

the grill, which is purchased from the original outdoor franchise store;

high voltage electric field low temperature plasma cold sterilization equipment, such as equipment described in patent CN209345983U.

It should be noted that, embodiments without specific conditions are carried out according to conventional conditions or the conditions recommended by the manufacturer. The used reagents or instruments without manufacturers are conventional products that can be available on the market.

In the disclosure, vinegar is a sour flavoring agent. Its main component is acetic acid. It also contains rich calcium, amino acids, succinic acid, gluconic acid, malic acid, lactic acid, B vitamins and salts and beneficial nutrition components; the types of vinegar include but are not limited to Shanxi aged vinegar with sorghum as a raw material, Sichuan bran vinegar with bran as a raw material, Zhenjiang vinegar with glutinous rice as a raw material, Jiangbo rose rice vinegar with rice as a raw material, Dandong pagoda vinegar made from liquor, Pineapple Vinegar and banana vinegar with glutinous rice, red koji and sesame as raw materials, alcohol vinegar, wine vinegar, apple vinegar, grape vinegar, malt vinegar, distilled white vinegar, etc. The vinegar in the disclosure is, for example, the vinegar described in Chinese patent application or Chinese Patent CN201710736562.6, CN201410070401.4 and CN201410506299.8.

In the disclosure, the chemical name of edible baking soda is sodium bicarbonate which serves as an alkaline regulator to regulate the pH value of the soaking solution in the present application.

In the disclosure, sunflower seed oil refers to oil extracted from sunflower seeds, one of edible oils. Sunflower seed oil contains sterols, vitamins, linoleic acid and other substances beneficial to human. The composition of fatty acids in sunflower seed oil is affected by climate conditions. Sunflower seed oil produced in cold regions contains about 15% of oleic acid and about 70% of linoleic acid; sunflower seed oil produced in warm regions contains about 65% of oleic acid and about 20% of linoleic acid. The digestibility of sunflower seed oil in human body is 96.5%. It is rich in linoleic acid, which can significantly reduce cholesterol, prevent vascular sclerosis and prevent coronary heart disease. In addition, the content of α-tocopherol which has the strongest physiological activity in sunflower seed oil was higher than that in common vegetable oil. Moreover, a ratio of linoleic acid to vitamin E is relatively balanced, which is convenient for being adsorbed and utilized by the human body. Therefore, sunflower seed oil is good edible oil which has a high nutritional value and good for human health. 90% of sunflower seed oil is unsaturated fatty acid, in which linoleic acid accounts for about 66%. It also contains vitamin E, phytosterols, phospholipids, carotene and other nutrients. Sunflower seed oil contains a lot of vitamin E, which can prevent the excessive oxidation of unsaturated fatty acids in the body, promote the activity of capillaries, improve the circulatory system, and prevent arteriosclerosis and other vascular diseases. Linoleic acid contained in sunflower seed oil is an essential fatty acid for human body. It constitutes the basic component of various cells. It can regulate metabolism, maintain blood pressure balance and reduce blood cholesterol. Sunflower seed oil contains trace phytol and phospholipid, which can prevent the increase of serum cholesterol. The carotene contained in sunflower seed oil can be converted into vitamin A after being absorbed by human body, which can prevent night blindness, dry skin and other diseases, and has an anti-cancer effect. At the same time, sunflower seed oil is light and transparent and can retain the flavor of natural food when cooking, and its smoke point is also very high, which can avoid the harm of lampblack to human body. The sunflower seed oil in the present application is a conventional sunflower seed oil sold in the market. For example, sunflower seed oil described in Chinese Patent or Patent Application CN201810535512.6, CN201610318734.3, CN200710099536.3, CN2017106-83374.1 and CN201510141336.4, or sunflower seed oil obtained by the preparation methods described therein; and the sunflower seed oil described in the US patent U.S. Ser. No. 09/326,501 and U.S. Ser. No. 09/370,496.

In the disclosure, rapeseed oil refers to oil extracted from rapeseeds, one of edible oils. The rapeseed oil is a conventional rapeseed oil available in the market. For example, the rapeseed oil described in Chinese patent application CN201910174456.2 and CN201910494922.5, or rapeseed oil obtained by the preparation method described therein; the rapeseed oil described in the U.S. patent Ser. Nos. 15/980, 218, 16/083,061 and U.S. Ser. No. 16/323,622, or the rapeseed oil obtained by the preparation method described therein.

In the disclosure, soybean oil, also known as soya bean oil, refers to oil extracted from soybeans/soya beans, one of edible oils. The soybean oil is the conventional soybean oil available in the market. For example, the soybean oil described in the U.S. patent Ser. No. 05/524,501 and U.S. Ser. No. 11/201,948, or soybean oil obtained by the preparation methods described therein.

In the disclosure, the open fire refers to the flame which can be seen after the carbon fire is ignited.

In the disclosure, muscle fiber is a muscle cell. The muscle cell is of a long line shape.

The muscle cells are arranged in parallel along a certain direction in microstructure and gathered to form muscle bundles and then form muscle tissues. The extension direction of muscle fibers in the muscle tissues can be seen by naked eyes.

Example 1

A charcoal grilled chicken is prepared by using the following grilling method:

Step 1: chicken was cut into strips with a thickness of 1 cm and evenly dispensed to boxes with sealing covers, sunflower seed oil was added to the boxes and sealed, wherein the ratio of sunflower seed oil to the weight of chicken was 50 mL/1000 g;

Step 2: the chicken in Step 1 was grilled on the grill. The specific method was that solid alcohol blocks were used to ignite charcoal fire; after the open fire of all the charcoal was ended, the meat sample was put on the grill which is far away from the fire source by 5 cm; the meat was turned over every 2 min; when the grilling time was 12 min, the internal temperature of the sample was measured with a probe thermometer; when the internal temperature reached 75° C., the grilling was stopped; when the internal temperature did not reach 75° C., grilling was continued, until the internal temperature reached 75° C.; when the internal temperature reached 75° C., the surface temperature of charcoal fire at the moment was measured using an infrared thermometer, and the surface temperature of charcoal fire was kept to be 180~220° C.

Example 2

A charcoal grilled chicken is prepared by using the following grilling method:

Step 1: chicken was cut into strips with a thickness of 1 cm and evenly dispensed to boxes with sealing covers, rapeseed oil was added to the boxes and sealed, wherein the ratio of rapeseed oil to the weight of chicken was 50 mL/1000 g;

Step 2: the chicken in Step 1 was grilled on the stainless-steel grill. The specific method was that solid alcohol blocks were used to ignite charcoal fire; after the open fire of all the charcoal was ended, the sample meat was put on the grill which is far away from the fire source by 5 cm; the meat was turned over every 2 min; when the grilling time was 12 min, the internal temperature of the sample was measured with a probe thermometer; when the internal temperature reached 75° C., the grilling was stopped; when the internal temperature did not reach 75° C., grilling was continued, until the internal temperature reached 75° C.; when the internal temperature reached 75° C., the surface temperature of charcoal fire at the moment was measured using an infrared thermometer, and the surface temperature of charcoal fire was kept to be 180~220° C.

Example 3

A charcoal grilled chicken is prepared by using the following grilling method:

Step 1: chicken was cut into strips with a thickness of 1 cm and evenly dispensed to boxes with sealing covers, soybean oil was added to the boxes and sealed, wherein the ratio of soybean oil to the weight of chicken was 50 mL/1000 g;

Step 2: the chicken in Step 1 was grilled on the stainless-steel grill. The specific method was that solid alcohol blocks were used to ignite charcoal fire; after the open fire of all the charcoal was ended, the sample meat was put on the grill which is far away from the fire source by 5 cm; the meat was turned over every 2 min; when the grilling time was 12 min, the internal temperature of the sample was measured with a probe thermometer; when the internal temperature reached 75° C., the grilling was stopped; when the internal temperature did not reach 75° C., grilling was continued, until the internal temperature reached 75° C.; when the internal temperature reached 75° C., the surface temperature of charcoal fire at the moment was measured using an infrared thermometer, and the surface temperature of charcoal fire was kept to be 180~220° C.

Example 4

A charcoal grilled chicken is prepared by using the following grilling method:

Step 1: chicken was cut into strips with a thickness of 1 cm and soaked for 1 h in soaking solution at 4° C.; each 1000 mL of soaking solution included 8 mL of edible vinegar, 2 g of baking soda in the solvent of water; the soaking ratio of chicken in the soaking solution was 1000 g/1000 mL; the pH of the soaking solution was 3.3; the soaked chicken was evenly dispensed into boxes with sealing covers, soybean oil was added into the boxes and sealed, the ratio of soybean to the weight of chicken was 50 mL/1000 g;

Step 2: the chicken in Step 1 was grilled on the stainless-steel grill. The specific method was that solid alcohol blocks were used to ignite charcoal fire; after the open fire of all the charcoal was ended, the sample meat was put on the grill which is far away from the fire source by 5 cm; the meat was turned over every 2 min; when the grilling time was 12 min, the internal temperature of the sample was measured with a probe thermometer; when the internal temperature reached 75° C., the grilling was stopped; when the internal temperature did not reach 75° C., grilling was continued, until the internal temperature reached 75° C.; when the internal temperature reached 75° C., the surface temperature of charcoal fire at the moment was measured using an infrared thermometer, and the surface temperature of charcoal fire was kept to be 180~220° C.

Example 5

A charcoal grilled chicken is prepared by using the following grilling method:

Step 1: chicken was cut into strips with a thickness of 1 cm and evenly dispensed to boxes with sealing covers, soybean oil was added to the boxes and sealed, wherein the ratio of soybean oil to the weight of chicken was 50 mL/1000 g;

Step 2: the chicken in Step 1 was subjected to plasma treatment; The specific method was that the sealed chicken was placed in high-voltage electric field cold plasma non-thermal sterilization equipment, treatment parameters were set as the electrode gap being 4.0 cm, the voltage of the high-voltage electric field being 80 kV and discharging time being 180 s;

Step 3, chicken treated by plasma was grilled on a stainless-steel grill; the specific method was that solid alcohol blocks were used to ignite charcoal fire; after the open fire of all the charcoal was ended, the sample meat was put on the grill which is far away from the fire source by 5 cm; the meat was turned over every 2 min; when the grilling time was 12 min, the internal temperature of the sample was measured with a probe thermometer; when the internal temperature reached 75° C., the grilling was stopped; when the internal temperature did not reach 75° C., grilling was continued, until the internal temperature reached 75° C.; when the internal temperature reached 75° C., the surface temperature of charcoal fire at the moment was measured using an infrared thermometer, and the surface temperature of charcoal fire was kept to be 180~220° C.

Example 6

A charcoal grilled chicken is prepared by using the following grilling method:

Step 1: chicken was cut into strips with a thickness of 1 cm and evenly dispensed to boxes with sealing covers, sunflower seed oil was added to the boxes and sealed, wherein the ratio of sunflower seed oil to the weight of chicken was 25 mL/1000 g;

Step 2: the chicken in Step 1 was grilled on the stainless-steel grill. The specific method was that solid alcohol blocks were used to ignite charcoal fire; after the open fire of all the charcoal was ended, the sample meat was put on the grill which is far away from the fire source by 5 cm; the meat was turned over every 2 min; when the grilling time was 12 min, the internal temperature of the sample was measured with a probe thermometer; when the internal temperature reached 75° C., the grilling was stopped; when the internal temperature did not reach 75° C., grilling was continued, until the internal temperature reached 75° C.; when the internal temperature reached 75° C., the surface temperature of charcoal fire at the moment was measured using an infrared thermometer, and the surface temperature of charcoal fire was kept to be 180~220° C.

Example 7

A charcoal grilled chicken is prepared by using the following grilling method:

Step 1: chicken was cut into strips with a thickness of 1 cm and evenly dispensed to boxes with sealing covers, rapeseed oil was added to the boxes and sealed, wherein the ratio of rapeseed oil to the weight of chicken was 25 mL/1000 g;

Step 2: the chicken in Step 1 was grilled on the stainless-steel grill. The specific method was that solid alcohol blocks were used to ignite charcoal fire; after the open fire of all the charcoal was ended, the sample meat was put on the grill which is far away from the fire source by 5 cm; the meat was turned over every 2 min; when the grilling time was 12 min, the internal temperature of the sample was measured with a probe thermometer; when the internal temperature reached 75° C., the grilling was stopped; when the internal temperature did not reach 75° C., grilling was continued, until the internal temperature reached 75° C.; when the internal temperature reached 75° C., the surface temperature of charcoal fire at the moment was measured using an infrared thermometer, and the surface temperature of charcoal fire was kept to be 180~220° C.

Example 8

A charcoal grilled chicken is prepared by using the following grilling method:

Step 1: chicken was cut into strips with a thickness of 1 cm and evenly dispensed to boxes with sealing covers, sunflower seed oil was added to the boxes and sealed, wherein the ratio of sunflower seed oil to the weight of chicken was 50 mL/1000 g;

Step 2: the chicken in Step 1 was subjected to plasma treatment; The specific method was that the sealed chicken was placed in high-voltage electric field cold plasma non-thermal sterilization equipment, treatment parameters were set as the electrode gap being 4.0 cm, the voltage of the high-voltage electric field being 80 kV and discharging time being 180 s;

Step 3, chicken treated by plasma was grilled on the stainless-steel grill; the specific method was that solid alcohol blocks were used to ignite charcoal fire; after the open fire of all the charcoal was ended, the sample meat was put on the grill which is far away from the fire source by 5 cm;

the meat was turned over every 2 min; when the grilling time was 12 min, the internal temperature of the sample was measured with a probe thermometer; when the internal temperature reached 75° C., the grilling was stopped; when the internal temperature did not reach 75° C., grilling was continued, until the internal temperature reached 75° C.; when the internal temperature reached 75° C., the surface temperature of charcoal fire at the moment was measured using an infrared thermometer, and the surface temperature of charcoal fire was kept to be 180~220° C.

Example 9

A charcoal grilled chicken is prepared by using the following grilling method:

Step 1: chicken was cut into strips with a thickness of 1 cm and soaked for 1 h in soaking solution at 4° C.; each 1000 mL of soaking solution included 8 mL of edible vinegar, 1 g of baking soda in the solvent of water; the soaking ratio of chicken in the soaking solution was 1000 g/1000 mL; the pH of the soaking solution was 3.3; the soaked chicken was evenly dispensed into boxes with sealing covers, sunflower seed oil was added into the boxes and sealed, the ratio of sunflower seed oil to the weight of chicken was 50 mL/1000 g;

Step 2, the chicken in Step 1 was subjected to plasma treatment; the specific method was that the sealed chicken was placed in high-voltage electric field cold plasma non-thermal sterilization equipment, treatment parameters are set as an electrode gap being 4.0 cm, the voltage of the high-voltage electric field being 80 kV, and discharging time being 180 s.

Step 3, chicken treated by plasma was grilled on the stainless-steel grill; the specific method was that solid alcohol blocks were used to ignite charcoal fire; after the open fire of all the charcoal was ended, the sample meat was put on the grill which is far away from the fire source by 5 cm; the meat was turned over every 2 min; when the grilling time was 12 min, the internal temperature of the sample was measured with a probe thermometer; when the internal temperature reached 75° C., the grilling was stopped; when the internal temperature did not reach 75° C., grilling was continued, until the internal temperature reached 75° C.; when the internal temperature reached 75° C., the surface temperature of charcoal fire at the moment was measured using an infrared thermometer, and the surface temperature of charcoal fire was kept to be 180~220° C.

Comparative Example 1

Step 1, chicken was cut into strips with a thickness of 1 cm and then placed and grilled on the stainless-steel grill; the specific method was that solid alcohol blocks were used to ignite charcoal fire; after the open fire of all the charcoal was ended, the meat sample was put on the grill which is far away from the fire source by 5 cm; the meat was turned over every 2 min; when the grilling time was 12 min, the internal temperature of the sample was measured with a probe thermometer; when the internal temperature reached 75° C., the grilling was stopped; when the internal temperature did not reach 75° C., grilling was continued, until the internal temperature reached 75° C.; when the internal temperature reached 75° C., the surface temperature of charcoal fire at the moment was measured using an infrared thermometer, and the surface temperature of charcoal fire was kept to be 180~220° C.

The meat used in all the above examples and comparative examples is the same raw chicken breast purchased in the same batch.

Experimental Data and Analysis

The contents of polycyclic aromatic hydrocarbons in grilled chicken prepared in the above examples 1~9 and comparative example 1 were measured: the measurement method of polycyclic aromatic hydrocarbons refers to GB 5009.265~2016 method 1 National Food Safety Standard: Measurement Method of Polycyclic Aromatic Hydrocarbons in Food.

Table 1 shows the contents of several polycyclic aromatic hydrocarbons (PAHs) in the charcoal grilled chicken prepared by the above examples and comparative example. Table 2 shows variations of content of polycyclic aromatic hydrocarbons in different examples and comparative examples.

The generation of polycyclic aromatic hydrocarbons (PAHs) in grilled food is largely because of pyrolysis, oxidation and cyclization of oils and fats in the food system. In the open fire grilling process, the oil is leached from the meat and dripped onto the burning charcoal fire and wood. The smoke generated by combustion of oil and heat source adheres to the surface of the meat, which may cause considerable pollution. Therefore, antioxidant capacity and fatty acid composition (unsaturation degree) of grilling oil have a significant impact on the generation of polycyclic aromatic hydrocarbons (PAHs) in grilled meat. Compared to examples 1, 2 and 3, It is shown that under the condition that the amounts of edible oil are the same during the grilling process, different kinds of edible oils have significant influence on the content of polycyclic aromatic hydrocarbons (PAHs) in charcoal grilled chicken. Compared to rapeseed oil in example 2 and soybean oil in example 3, sunflower seed oil in example 1 can significantly reduce the content of polycyclic aromatic hydrocarbons in charcoal grilled chicken; compared to example 1 and comparative example 1, it can be seen that compared to comparative example 1 in which edible oil is not added, the use of sunflower seed oil in grilling process not only does not increase the content of polycyclic aromatic hydrocarbons, but also effectively reduces the content of Benzo(b)fluoranthene. Therefore, the sunflower seed oil adopted in the disclosure can effectively control the content of polycyclic aromatic hydrocarbons in charcoal grilled meat.

Compared to examples 3 and 4, it can be seen that on the premise of the same edible oil variety, the chicken is first soaked with the soaking solution of the disclosure in the process of grilling, which can significantly reduce the content of polycyclic aromatic hydrocarbons in the charcoal grilled meat.

Compared to examples 3 and 5, it can be seen that on the premise of the same edible oil variety, the sealed chicken is first treated with plasma in the process of grilling, which can significantly reduce the content of polycyclic aromatic hydrocarbons in the charcoal grilled meat.

Compared to examples 1 and 6 as well as examples 2 and 7, it can be seen that when edible oil uses sunflower seed oil or rapeseed oil, when the addition amount of sunflower seed oil or rapeseed oil is 50 mL/1000 g and 25 mL/1000 g, the content of polycyclic aromatic hydrocarbons (PAHs) in charcoal grilled meat is not obviously affected. Considering the sensory flavor of charcoal grilled meat, it is proper that 50 mL edible oil is used for each 1000 g meat.

TABLE 1

Content of Polycyclic Aromatic Hydrocarbons in Charcoal Grilled Chicken

| Groups | Benzo (a) anthracene | Chrysene | Benzo (b) fluoranthene | Benzo (k) fluoranthene | Benzo (a) pyrene |
|---|---|---|---|---|---|
| Example 1 | $0.21 \pm 0.35^d$ | $0.34 \pm 0.55^{cd}$ | $2.45 \pm 4.24^b$ | $0.06 \pm 0.06^b$ | $0.15 \pm 0.05^b$ |
| Example 2 | $1.87 \pm 0.25^b$ | $2.46 \pm 0.66^b$ | $7.65 \pm 1.87^a$ | $1.58 \pm 1.52^a$ | $0.80 \pm 0.11^a$ |
| Example 3 | $4.22 \pm 0.63^a$ | $4.40 \pm 0.98^a$ | $5.83 \pm 6.31^a$ | $0.54 \pm 0.31^b$ | $0.72 \pm 0.40^a$ |
| Example 4 | $0.57 \pm 0.49^{cd}$ | $1.43 \pm 1.34^{bcd}$ | $0.78 \pm 1.36^a$ | $0.49 \pm 0.13^b$ | $0.56 \pm 0.14^{ab}$ |
| Example 5 | ND | $0.03 \pm 0.03^d$ | ND | $0.33 \pm 0.01^b$ | $0.35 \pm 0.02^{ab}$ |
| Example 6 | $0.24 \pm 0.42^d$ | $0.35 \pm 0.59^{cd}$ | ND | $0.38 \pm 0.09^b$ | $0.53 \pm 0.34^{ab}$ |
| Example 7 | $1.35 \pm 0.14^{bc}$ | $1.75 \pm 0.46^{bc}$ | $5.10 \pm 0.95^a$ | $0.54 \pm 0.04^b$ | $0.59 \pm 0.03^{ab}$ |
| Comparative example 1 | $0.80 \pm 0.77^{cd}$ | $0.68 \pm 0.63^{cd}$ | ND | $0.53 \pm 0.19^b$ | $0.52 \pm 0.27^{ab}$ |

| Groups | Dibenzo (a, h) anthracene | Benzo (g, h, i) perylene | Indeno (1, 2, 3-c, d) pyrene | Total amount |
|---|---|---|---|---|
| Example 1 | $0.18 \pm 0.01^d$ | $0.25 \pm 0.06^a$ | $0.19 \pm 0.03^c$ | $3.83 \pm 5.33^d$ |
| Example 2 | $4.22 \pm 0.54^{bc}$ | $1.98 \pm 0.71^a$ | $1.96 \pm 0.40^a$ | $21.62 \pm 2.25^b$ |
| Example 3 | $11.69 \pm 3.16^a$ | $7.55 \pm 9.00^a$ | $0.03 \pm 0.06^c$ | $33.51 \pm 13.52^a$ |
| Example 4 | $1.08 \pm 1.15^{cd}$ | $1.34 \pm 0.79^a$ | $1.19 \pm 0.60^{ab}$ | $7.44 \pm 4.66^{cd}$ |
| Example 5 | $0.06 \pm 0.06^d$ | $0.47 \pm 0.15^a$ | $0.37 \pm 0.32^{bc}$ | $1.61 \pm 0.53^d$ |
| Example 6 | ND | $1.00 \pm 1.13^a$ | $0.50 \pm 0.01^{bc}$ | $2.67 \pm 2.86^d$ |
| Example 7 | $4.65 \pm 1.99^b$ | $1.45 \pm 0.99^a$ | $1.77 \pm 0.42^a$ | $17.21 \pm 1.83^{bc}$ |
| Comparative example 1 | ND | $0.63 \pm 0.25^a$ | $1.26 \pm 0.99^{ab}$ | $4.36 \pm 2.78^d$ |

Note:
in Table 1, ND means not detected; the content unit is ng/g; a statistical analysis method in the table adopts one-way analysis of variance and multiple comparison is conducted with Duncan method, and the statistical significance level is set as $P < 0.05$; the data in the table are expressed as the mean ± standard deviation of samples, and different letters in the same column indicate significant difference ($P < 0.05$).

TABLE 2

Difference Comparison of Polycyclic Aromatic Hydrocarbons

| Groups | Benzo (a) anthracene | Chrysene | Benzo (b) fluoranthene | Benzo (k) fluoranthene | Benzo (a) pyrene | Dibenzo (a, h) anthracene | Benzo (g, h, i) perylene | Indeno (1, 2, 3-c, d) pyrene | Total amount |
|---|---|---|---|---|---|---|---|---|---|
| Comparative example 1-example 1 | No | No | No | Reduce** | No | No | No | No | No |
| Comparative example 1-example 2 | No | Increase* | Increase* | No | No | No | No | No | Increase** |
| Comparative example 1-example 3 | Increase** | Increase** | Increase** | No | No | Increase** | No | No | Increase** |
| Comparative example 1-example 5 | No | No | ND | No | No | No | No | No | No |
| Example 2-example 1 | Reduce** | Reduce* | No | No | Reduce** | Reduce* | No | No | Reduce** |
| Example 3-example 1 | Reduce** | Reduce** | No | Reduce* | Reduce* | Reduce** | No | Increase** | Reduce** |
| Example 3-example 5 | Reduce** | Reduce** | Reduce** | No | No | Reduce** | No | No | Reduce** |
| Example 3-example 4 | Reduce** | Reduce** | No | No | No | Reduce** | No | Increase* | Reduce** |
| Example 7-example 2 | No | No | No | No | No | No | No | No | No |
| Example 6-example 1 | No | No | No | Reduce** | No | Increase** | No | Reduce** | No |

Note:
in Table 2, the sample difference analysis method adopts t-test, "*" means significant difference ($P < 0.1$), "**" means extremely significant difference ($P < 0.05$), and "ND" means not detected. "Increase" and "Reduce" in Table 2 refer to the variation of the latter example relative to the former example in the two examples of the group.

The above-mentioned examples only express several embodiments of the disclosure, and their descriptions are more specific and detailed, but can not be understood as limiting the scope of the present invention patent. It should be noted that several deformations and improvements can also be made by persons of ordinary skill in the art without departing from the concept of the disclosure, which belong to the protective scope of the disclosure. Therefore, the protective scope of the present invention patent shall be based on the attached claims.

What is claimed is:

1. A grilling method for controlling the content of polycyclic aromatic hydrocarbons in charcoal grilled meat, comprising the following steps:
    step 1, dispensing to-be-grilled meat into boxes with sealing covers, and adding edible oil into the boxes, wherein a ratio of edible oil to the weight of meat is 25~50 mL/1000 g, and sealing the covers;

step 2, carrying out plasma treatment on the meat sealed in step 1; and step 3: placing the meat treated using plasma onto a grill and grilling, wherein the edible oil is sunflower seed oil;

wherein before dispensing, the meat is cut into strips with a thickness of 1~2.5 cm, and then soaked into soaking solution which is prepared by water, an acidic flavoring agent and edible baking soda;

wherein the acidic flavoring agent is vinegar, the pH of the soaking solution is 3.3~3.8, wherein a ratio of to-be-grilled meat to soaking solution is 1000 g/1000 mL, and the condition of soaking is soaking for 1~4 h at 4° C.; and wherein in step 2, the specific plasma treatment method is that the sealed meat is placed in a electric field plasma non-thermal sterilization equipment, treatment parameters are set as an electrode gap being 4.0 cm, the voltage of the electric field being 80 kV, and discharging time being 120~180 s.

2. The grilling method for controlling the content of polycyclic aromatic hydrocarbons in charcoal grilled meat according to claim 1, wherein the specific grilling method in step 3 is as follows: a solid alcohol block is used to ignite a charcoal fire; after the open fire of all the charcoal is ended, the sample meat is placed on the grill which is far away from a fire source by 5 cm; the meat is turned over every 2 min; when the grilling time is 12 min, the internal temperature of the sample is measured with a probe thermometer; when the internal temperature reaches 75° C., the grilling is stopped; when the internal temperature does not reach 75° C., the grilling is continued, until the internal temperature is 75° C.

3. The grilling method for controlling the content of polycyclic aromatic hydrocarbons in charcoal grilled meat according to claim 2, wherein when the internal temperature of the sample reaches 75° C., the surface temperature of the charcoal fire at the moment is measured with an infrared thermometer, and the surface temperature of the charcoal fire is kept to be 180~220° C.

4. The grilling method for controlling the content of polycyclic aromatic hydrocarbons in charcoal grilled meat according to claim 1, wherein the kinds of meat comprise chicken, duck, beef, pork and mutton.

* * * * *